(12) United States Patent
Wang et al.

(10) Patent No.: US 9,093,909 B2
(45) Date of Patent: Jul. 28, 2015

(54) SWITCHING MODE POWER SUPPLY AND THE METHOD THEREOF

(71) Applicant: Chengdu Monolithic Power Systems Co., Ltd., Chengdu (CN)

(72) Inventors: Siran Wang, Hangzhou (CN); Junming Zhang, Hangzhou (CN); Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 133 days.

(21) Appl. No.: 13/889,286

(22) Filed: May 7, 2013

(65) Prior Publication Data

US 2013/0301311 A1     Nov. 14, 2013

(30) Foreign Application Priority Data

May 8, 2012  (CN) .......................... 2012 1 0139245

(51) Int. Cl.
G05F 1/00       (2006.01)
H02M 3/335    (2006.01)

(52) U.S. Cl.
CPC ...... H02M 3/33515 (2013.01); H02M 3/33507 (2013.01); H02M 3/33523 (2013.01)

(58) Field of Classification Search
None
See application file for complete search history.

(56) References Cited

U.S. PATENT DOCUMENTS

| | | | |
|---|---|---|---|
| 4,355,237 A * | 10/1982 | Harris, Jr. ..................... 250/551 |
| 5,999,433 A * | 12/1999 | Hua et al. ...................... 363/132 |
| 6,349,045 B1 * | 2/2002 | Kogel et al. ..................... 363/20 |
| 7,339,804 B2 * | 3/2008 | Uchida ......................... 363/56.1 |
| 7,872,883 B1 * | 1/2011 | Elbanhawy ..................... 363/25 |
| 7,936,160 B1 * | 5/2011 | Sheehan ....................... 323/285 |
| 2005/0237037 A1 * | 10/2005 | Xing ............................ 323/268 |
| 2005/0258814 A1 * | 11/2005 | Chen et al. .................... 323/285 |
| 2007/0086217 A1 * | 4/2007 | Zhang et al. ..................... 363/17 |
| 2010/0033992 A1 * | 2/2010 | Fukui et al. ..................... 363/16 |
| 2010/0124080 A1 * | 5/2010 | Yeh et al. .................... 363/21.12 |
| 2010/0271849 A1 * | 10/2010 | Grant et al. ................ 363/21.15 |
| 2010/0289471 A1 * | 11/2010 | Kasai et al. .................... 323/282 |
| 2010/0302815 A1 | 12/2010 | Li |
| 2011/0051470 A1 | 3/2011 | Li |
| 2011/0085359 A1 * | 4/2011 | Gong et al. ................. 363/21.18 |
| 2011/0089925 A1 * | 4/2011 | Ishida et al. ................... 323/285 |
| 2012/0112795 A1 | 5/2012 | Wang |

* cited by examiner

Primary Examiner — Timothy J Dole
Assistant Examiner — Bryan R Perez
(74) Attorney, Agent, or Firm — Perkins Coie LLP

(57) ABSTRACT

A switching mode power supply, having: an input port; an output port; an energy storage component and a pair of power switches coupled between input port and the output port; an error amplifier configured to generate an amplified error signal based on the feedback signal and the reference signal; an error comparator configured to generate a frequency control signal based on the amplified error signal and the first sawtooth signal; a peak current generator configured to generate a peak current signal based on the frequency control signal; a peak current comparator configured to generate a current limit signal based on the peak current signal and the current sense signal; and a logic circuit configured to generate a switching signal to control the power switches based on the frequency control signal and the current limit signal.

11 Claims, 7 Drawing Sheets

SWITCHING MODE POWER SUPPLY AND THE METHOD THEREOF

CROSS-REFERENCE TO RELATED APPLICATION(S)

This application claims priority to and the benefit of Chinese Patent Application No. 201210139245.3, filed May 8, 2012, which is incorporated herein by reference in its entirety.

TECHNICAL FIELD

The present invention relates generally to electronic circuits, and more particularly but not exclusively to switching mode power supply and the method thereof.

BACKGROUND

Switching mode power supplies are widely applied in electronic equipments. Peak current control is one of the common control methods adopted in switching mode power supplies. In peak current controlled switching mode power supplies, a current flowing through an energy storage component is compared to a constant peak current signal to generate a signal to control a power switch so as to control the energy supplied to the load. But the constant peak current causes low efficiency under light load condition.

SUMMARY

It is an object of the present invention to provide a switching mode power supply and the method thereof to solve the above problems.

In accomplishing the above and other objects, there has been provided, in accordance with an embodiment of the present invention, a switching mode power supply comprising: an input port configured to receive an input voltage; an output port configured to provide an output voltage to a load; an energy storage component and a power switches coupled between the input port and the output port; an error amplifier having a first input terminal configured to receive a feedback signal indicative of the output voltage, a second input terminal configured to receive a reference signal, and an output terminal configured to generate an amplified error signal based on the feedback signal and the reference signal; an error comparator having a first input terminal configured to receive the amplified error signal, a second input terminal configured to receive a first sawtooth signal, and an output terminal configured to generate a frequency control signal based on the amplified error signal and the first sawtooth signal; a peak current generator having an input terminal coupled to the output terminal of the error comparator to receive the frequency control signal, and an output terminal configured to generate a peak current signal based on the frequency control signal; a peak current comparator having a first input terminal coupled to the output terminal of the peak current generator to receive the peak current signal, a second input terminal configured to receive a current sense signal indicative of a current flowing through the energy storage component, and an output terminal configured to generate a current limit signal based on the peak current signal and the current sense signal; and a logic circuit having a first input terminal coupled to the output terminal of the error comparator to receive the frequency control signal, a second input terminal coupled to the output terminal of the peak current comparator to receive the current limit signal, and an output terminal configured to generate a switching signal to control the power switches based on the frequency control signal and the current limit signal.

Furthermore, there has been provided, in accordance with an embodiment of the present invention, a switching mode power supply comprising: an input port configured to receive an input voltage; an output port configured to provide an output voltage to a load; an transformer having a primary winding, a secondary winding and a third winding respectively having a first terminal and a second terminal; a primary power switch coupled to the primary winding of the transformer; a secondary power switch coupled to the secondary winding of the transformer; a secondary controller configured to generate a first comparison signal based on the output voltage and a feedback signal indicative of the output voltage; a coupled device having an input side coupled to the secondary controller to receive the first comparison signal, and an output side configured to provide a frequency control signal based on the first comparison signal; a primary controller configured to control the primary power switch, comprising: a peak current generator having an input terminal coupled to the output side of the coupled device to receive the frequency control signal, and an output terminal configured to generate a peak current signal based on the frequency control signal; a peak current comparator having a first input terminal coupled to the output terminal of the peak current generator to receive the peak current signal, a second input terminal configured to receive a current sense signal indicative of a current flowing through the inductor, and an output terminal configured to generate a current limit signal based on the current limit signal and the current sense signal; and a logic circuit having a first input terminal coupled to the output terminal of the error comparator to receive the frequency control signal, a second input terminal coupled to the output terminal of the peak current comparator to receive the current limit signal, and an output terminal configured to generate a switching signal to control the primary power switch based on the frequency control signal and the current limit signal.

In addition, there has been provided, in accordance with an embodiment of the present invention, a method of controlling a switching mode power supply, the switching mode power supply comprising an input terminal configured to receive the input voltage, an output terminal configured to provide the output voltage, an energy storage component and a power switch coupled between the input terminal and the output terminal, the method comprising: turning ON and OFF the power switch periodically to convert the input voltage to the output voltage; generating a feedback signal indicative of the output voltage; amplifying the error between the feedback signal and a reference signal to generate an amplified error signal; comparing the amplified error signal and a sawtooth signal to generate a first comparison signal; converting the first comparison signal to a frequency control signal via a coupled device; generating a peak current signal based on the frequency control signal; sensing a current flowing through the power switch to generate a current sense signal; generating a current limit signal based on the current sense signal and the peak current signal; and generating a switching signal to control the power switch based on the current limit signal and the frequency control signal.

The presented switching mode power supply and the method thereof adjust the frequency according to the load so as to improve the efficiency of the switching mode power supply.

The use of the same reference label in different drawings indicates same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details, and could be adopted in many applications besides the phase-shift dimming circuits, for example, the invention could also be applied in interleaving circuits. In other instances, well-known details are not shown or described to avoid obscuring aspects of the invention.

Figure 1:
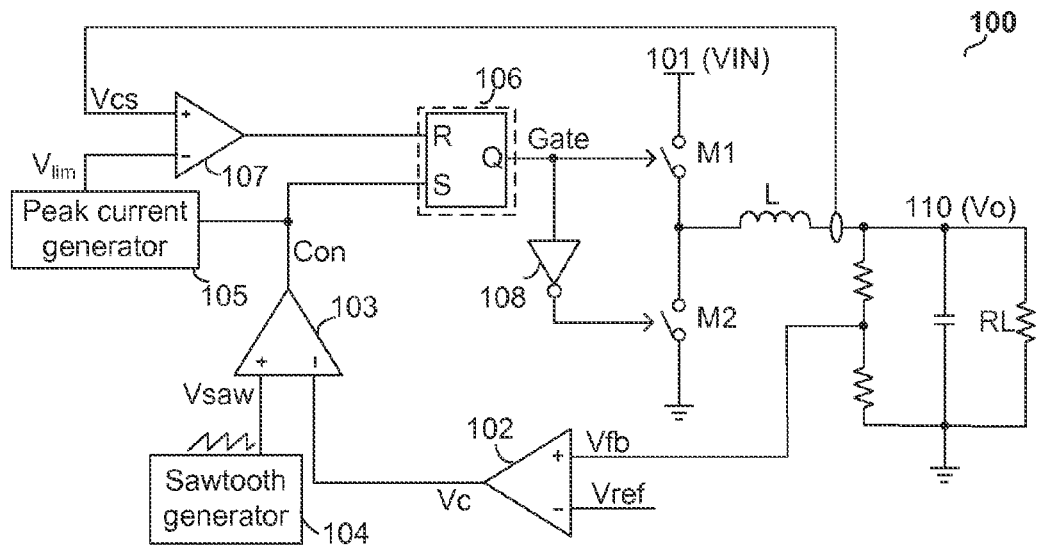
FIG. 1 schematically shows a switching mode power supply 100 in accordance with an embodiment of the present invention.

FIG. 1 schematically shows a switching mode power supply 100 in accordance with an embodiment of the present invention. The switching mode power supply 100 comprises: an input port 101 configured to receive an input voltage VIN; an output port 110 configured to provide an output voltage Vo; an energy storage component L, a first power switch M1 and a second power switch M2 coupled between the input port 101 and the output port 110; and a control circuit configured to control the power switches M1 and M2. The control circuit comprises: an error amplifier 102 having a first input terminal configured to receive a feedback signal Vfb indicative of the output voltage Vo, a second input terminal configured to receive a reference signal Vref, and an output terminal configured to generate an amplified error signal Vc based on the feedback signal Vfb and the reference signal Vref; an error comparator 103 having a first input terminal configured to receive the amplified error signal Vc, a second input terminal configured to receive a first sawtooth signal Vsaw, and an output terminal configured to generate a frequency control signal Con based on the amplified error signal Vc and the first sawtooth signal Vsaw; a peak current generator 105 having an input terminal coupled to the output terminal of the error comparator 103 to receive the frequency control signal Con, and an output terminal configured to generate a peak current signal Vlim based on the frequency control signal Con; a peak current comparator 107 having a first input terminal coupled to the output terminal of the peak current generator 105 to receive the peak current signal Vlim, a second input terminal configured to receive a current sense signal Vcs indicative of a current flowing through the energy storage component L, and an output terminal configured to generate a current limit signal based on the peak current signal Vlim and the current sense signal Vcs; and a logic circuit 106 having a first input terminal coupled to the output terminal of the error comparator 103 to receive the frequency control signal Con, a second input terminal coupled to the output terminal of the peak current comparator 107 to receive the current limit signal, and an output terminal configured to generate a switching signal "Gate" based on the frequency control signal Con and the current limit signal.

The power switches M1 and M2 are controlled by the switching signal "Gate". Persons of ordinary skill in the art should know that the switching signal "Gate" may be powered by a driver before controlling the power switches M1 and M2. The driver is well known to persons of ordinary skill in the art and is not shown in FIG. 1 for brevity.

In one embodiment, the logic circuit 106 comprises a first RS flip-flop. The first RS flip-flop has a set terminal "S" configured to receive the frequency control signal Con, a reset terminal "R" configured to receive the current limit signal, and an output terminal configured to generate the switching signal "Gate" based on the frequency control signal Con and the current limit signal.

Figure 2:
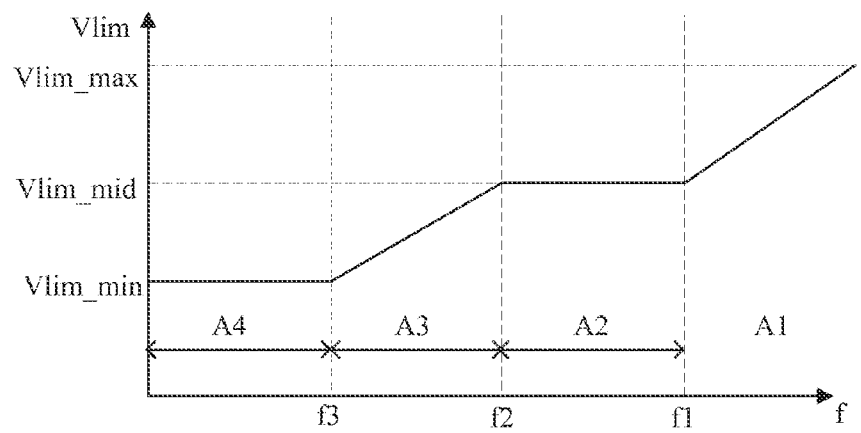
FIG. 2 shows the relationship between the peak current signal Vlim and the switching frequency "f" of the switching mode power supply 100 in FIG. 1.

In one embodiment, the relationship between the peak current signal Vlim and frequency control signal Con is determined by the switching frequency "f" of the switching mode power supply: a) when the switching frequency "f" is higher than a first frequency threshold "f1", the peak current signal Vlim decreases from a maximum value Vlim_max as the decrease of the switching frequency "f"; b) when the switching frequency "f" is between the first frequency threshold f1 and a second frequency threshold f2, the peak current signal Vlim is fixed to a middle value Vlim_mid; c) when the switching frequency "f" is between the second frequency threshold f2 and a third frequency threshold f3, the peak current signal Vlim decreases from the middle value Vlim_mid as the decrease of the switching frequency "f"; d) when the switching frequency "f" is lower than the third frequency threshold f3, the peak current signal Vlim is fixed to a minimum value Vlim_min; wherein f1>f2>f3, and Vlim_max>Vlim_mid>Vlim_min. FIG. 2 schematically shows the relationship between the peak current signal Vlim and the switching frequency "f", which could also be expressed as:

$$Vlim = \begin{cases} Vlim\_max - k \times \dfrac{1}{f} & (f > f1) \\ Vlim\_mid & (f2 \leq f \leq f1) \\ Vlim\_mid - k \times \left(\dfrac{1}{f} - \dfrac{1}{f2}\right) & (f3 < f < f2) \\ Vlim\_min & (f \leq f3) \end{cases} \quad (1)$$

wherein k is a constant coefficient in a given switching mode power supply 100.

In one embodiment, the peak current generator 105 may be automatically generated by hardware description language, for example, VHDL (Very-High-Speed Integrated Circuit Hardware Description Language) or Verilog HDL, by person of ordinary skill in the art.

In the normal operation of the switching mode power supply 100, the error amplifier 102 amplifies the error between the feedback signal Vfb and the reference signal Vref to generate the amplified error signal Vc. Because the reference signal Vref is constant, the increase of the feedback signal Vfb results in the increase of the amplified error signal Vc, and the decrease of the feedback signal Vfb results in the decrease of the amplified error signal Vc. The first sawtooth signal Vsaw increases from zero at each switching period. In a switching period, the frequency control signal Con generated by the error comparator 103 has a pulse each time the first sawtooth signal Vsaw reaches the value of the amplified error signal Vc to set the first RS flip-flop so as to turn ON the first power switch M1 and to turn OFF the second power switch M2. Then the current flowing through the inductor L increases, resulting in the increase of the current sense signal Vcs. Meanwhile, the peak current generator 105 detects the switching frequency of the switching mode power supply 100, and provides the peak current signal Vlim according to EQ. (1). When the current sense signal Vcs increases to the peak current signal Vlim, the current limit signal becomes logical high to reset the first RS flip-flop, so as to turn OFF the first power switch M1 and to turn ON the second power switch M2. The first power switch M1 will be turned ON and the second power switch M2 will be turned OFF when the first RS flip-flop is set by the pulse of the frequency control signal Con when the first sawtooth signal Vsaw increases to reach the amplified error signal Vc, then the current sense signal increases. When the current sense signal Vcs reaches the peak current signal Vlim, the current limit signal becomes logical high to reset the first RS flip-flop again, so as to turn OFF the first power switch M1 and to turn ON the second power switch M2. The operation repeats.

When the load changes from light to heavy, the output voltage Vo decreases, followed by the decrease of the feedback signal Vfb and the amplified error signal Vc. The pulse of the frequency control signal Con is generated each time the first sawtooth signal Vsaw reaches the amplified error signal Vc. Thus the lowered amplified error signal Vc shortens the time period between two pulses of the frequency control signal Con, which is also the switching period of the switching mode power supply 100. As a result, the frequency of the switching mode power supply 100 increases. When the load changes from heavy to light, the output voltage Vo increases, followed by the increase of the feedback signal Vfb and the amplified error signal Vc. The pulse of the frequency control signal Con is generated each time the first sawtooth signal Vsaw reaches the amplified error signal Vc. Thus the increased amplified error signal Vc prolongs the time period between two pulses of the frequency control signal, which is also the switching period of the switching mode power supply 100. As a result, the frequency of the switching mode power supply 100 decreases. In conclusion, the frequency of the switching mode power supply 100 could be adjusted according to the load.

Figure 3:
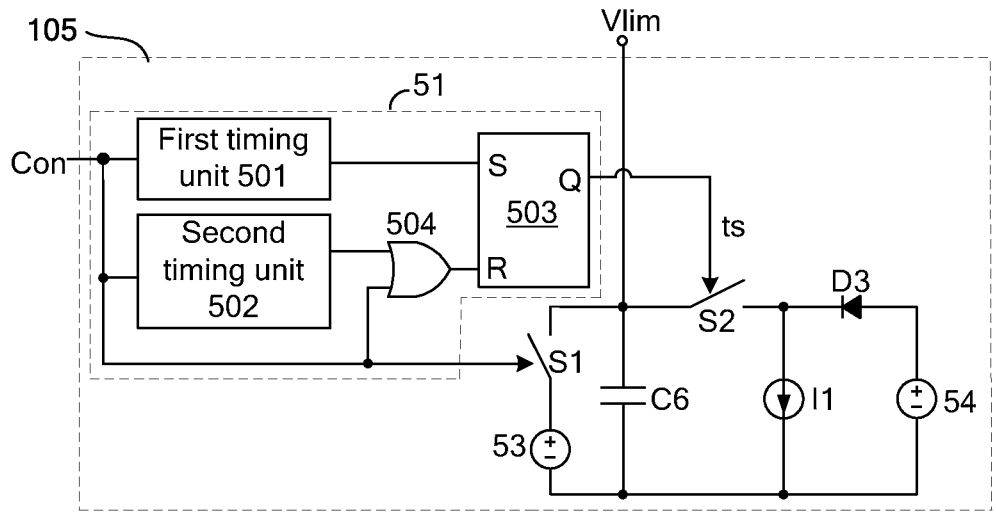
FIG. 3 schematically shows a circuit configuration of the peak current generator 105 of the switching mode power supply 100 in accordance with an embodiment of the present invention.

FIG. 3 schematically shows a peak current generator 105 of the switching mode power supply 100 in accordance with an embodiment of the present invention. The peak current generator 105 comprises: a timing circuit 51 comprising a first timing unit 501, a second timing unit 502, an OR gate 504 and a second RS flip-flop 503, wherein the first timing unit 501 configured to receive the frequency control signal Con, and to generate a first timing signal based on the frequency control signal Con; the second timing unit 502 configured to receive the frequency control signal Con, and to generate a second timing signal based on the frequency control signal Con; the OR gate 504 has a first input terminal configured to receive the first timing signal, a second input terminal configured to receive the frequency control signal Con, and an output terminal; the second RS flip-flop 503 has a set terminal "S" coupled to the first timing unit 501 to receive the first timing signal, a reset terminal "R" coupled to the output terminal of the OR gate 504 and an output terminal "Q" configured to generate a timing control signal "ts" based on the first timing signal and the output signal of the OR gate 504; a first switch S1 having a first terminal coupled to a voltage source 53 having a voltage value equal to the maximum value Vlim_max, a control terminal configured to receive the frequency control signal Con, and a second terminal; a second switch S2 having a first terminal coupled to the second terminal of the first switch S1, a control terminal coupled to the timing circuit 51 to receive the timing control signal "ts", and a second terminal; a third switch D3 having a first terminal coupled to the second terminal of the second switch S2, a second terminal coupled to a voltage source 54 having a minimum voltage value equal to the minimum value Vlim_min; a first capacitor C6 having a first terminal coupled to the connection node of the first switch S1 and the second switch S2, and a second terminal coupled to a ground reference node, wherein the peak current signal Vlim is provided at the first terminal of the capacitor C6; and a first current source I1 having a first terminal coupled to the connection node of the second switch S2 and the third switch D3, and a second terminal coupled to the ground reference node.

In one embodiment, the third switch D3 comprises a diode having an anode coupled to the voltage source 54 and a cathode coupled to the second terminal of the second switch S2.

In one embodiment, the second switch S2 is turned ON when the signal at the control terminal is logical low.

In one embodiment, the first timing unit 501 and the second timing unit 502 start timing from zero at every pulse of the frequency control signal Con. If the first timing unit 501 completes timing a time period 1/f1, the first timing unit 501 generates a pulse at its output terminal to set the second RS flip-flop 503; and if the second timing unit 502 completes timing a time period 1/f2, the second timing unit 502 generates a pulse at its output terminal to reset the second RS flip-flop 503. The second timing signal and the frequency control signal Con are provided to the reset terminal of the RS flip-flop 503 via the OR gate 504. Thus the RS flip-flop 503 may be reset either by the second timing signal or by the frequency control signal Con.

If the first timing unit 501 completes timing the time period 1/f1, the second RS flip-flop 503 is set by the first timing signal; and if the second timing unit 502 completes timing the time period 1/f2, the second RS flip-flop is reset by the second timing signal. If the time between two pulses of the frequency control signal Con is shorter than the time period 1/f1, which means the switching frequency "f" of the switching mode power supply 100 is higher than f1 (f>f1), there is no pulse in the first timing signal and the second timing signal. Thus the output signal of the second RS flip-flop 503 maintains initial logical low state.

If the time between the two adjacent pulses of the frequency control signal Con is longer than 1/f1 but shorter than 1/f2, which means the switching frequency "f" of the switching mode power supply 100 is between the first frequency threshold f1 and the second frequency threshold f2 (f2<f<f1), the second RS flip-flop 503 is firstly reset by the pulse of the frequency control signal Con and then set by the pulse of the first timing signal generated by the first timing unit 501 at time 1/f1. Because the two adjacent pulses of the frequency control signal Con is shorter than 1/f2, the timing control signal "ts" generated by the second RS flip-flops 503 maintains logical high before the next pulse of the frequency control signal Con.

Similarly, if the time between the two adjacent pulses of the frequency control signal Con is longer than 1/f2, which means the switching frequency "f" is lower than the second frequency threshold f2 (f<f2), then the second RS flip-flop 503 is firstly reset by the pulse of the frequency control signal Con, secondarily set by the pulse of the first timing signal when the first timing unit 501 completes timing the time period 1/f1, and then reset by the pulse of the second timing signal when the second timing unit 502 completes timing the time period 1/f2.

If the time between the two adjacent pulses of the frequency control signal Con is longer than 1/f3, which means the switching frequency "f" is lower than the third frequency threshold f3 (f<f3), then the second RS flip-flop 503 is firstly reset by the pulse of the frequency control signal Con, secondarily set by the pulse of the first timing signal, and then reset by the pulse of the second timing signal.

In the above embodiments, the first timing signal, the second timing signal and the timing control signal generated by the timing units are all pulse signals, and the second RS flip-flop 503 is pulse triggered. In some embodiments, the first timing signal, the second timing signal and the timing control signal generated by the timing units are level signals, and the second RS flip-flop 503 is level triggered and the reset terminal has priority to the set terminal. In one embodiment, the first timing signal and the second timing signal are both logical low after a pulse of the frequency control signal Con, and the initial state of the RS flip-flop 503 is logical low (the timing control signal "ts" is logical low) too. The second RS flip-flop 503 is reset by the pulse of the frequency control signal Con at the beginning. Then the second RS flip-flop 503 is set when the first timing signal becomes logical; and is reset when the first timing signal becomes logical low again and the second timing signal becomes logical high. In one embodiment, the second RS flip-flop 503 is implemented by some logic gates.

Persons of ordinary skill in the art should know that, the timing circuit 51 is configured to indicate the frequency of the switching mode power supply 100. Any suitable circuit that indicates if the frequency of the switching mode power supply 100 is between an interval f1~f2 may be used without detracting from the merits of the present invention.

Figure 4:
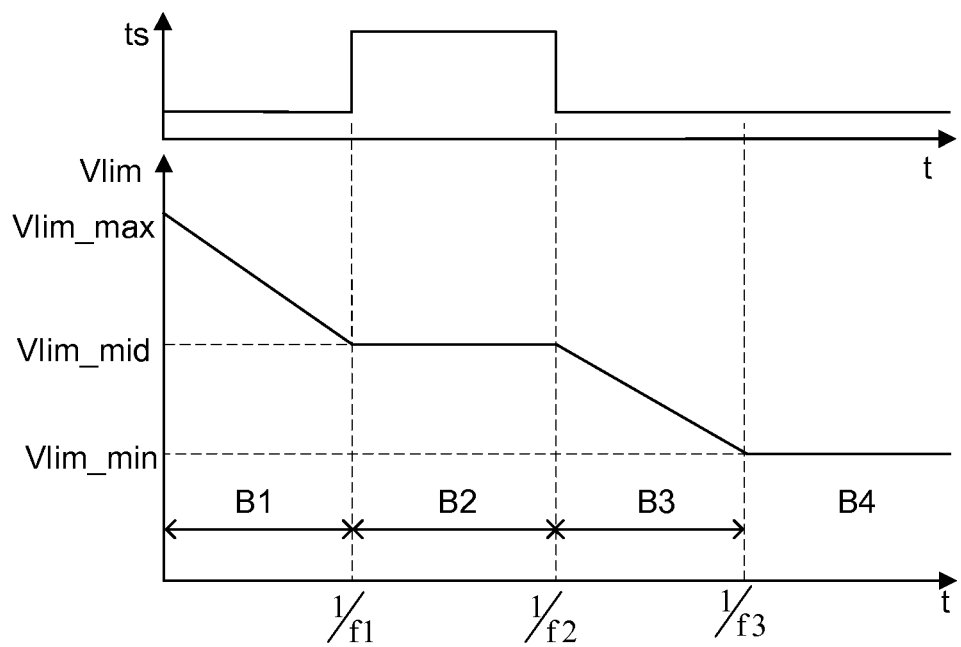
FIG. 4 shows the waveforms of the first timing signal "ts" and the peak current signal Vlim generated by the peak current generator 105 in FIG. 3.

FIG. 4 shows the waveforms of the timing control signal "ts" and the peak current signal Vlim generated by the peak current generator 105 in FIG. 3. The operation of the peak current generator 105 in FIG. 3 will be discussed with reference to FIGS. 3 and 4.

During the normal operation of the peak current generator 105, the first capacitor C6 is coupled to the voltage source 53 when the first switch S1 is turned ON by the pulse of the frequency control signal Con. Then the first capacitor C6 is coupled to the voltage source 53, and the voltage across the capacitor C6, i.e., the value of the peak current signal Vlim is equal to the maximum value Vlim_max at the end of the pulse of the frequency control signal Con. At this time, the second RS flip-flop 503 is reset by the pulse of the frequency control signal Con, and the second switch S2 is turned ON, so that the first current source I1 discharges the first capacitor C6. Thus the peak current signal Vlim decreases from the maximum value Vlim_max as shown in subinterval B1 in FIG. 4. If the time between the adjacent pulses of the frequency control signal Con is shorter than 1/f1, then the timing control signal "ts" keeps logical low during the current switching cycle. As a result, the first capacitor C6 keeps being discharged and the peak current signal Vlim keeps decreasing; If the time period between the adjacent pulses of the frequency control signal Con is between 1/f1 and 1/f2, then the second switch S2 is turned OFF, and the peak current signal Vlim maintains a middle value Vlim_mid, just as shown in subinterval B2 in FIG. 4; if the time period between the adjacent pulses of the frequency control signal Con is longer than 1/f2, then the second switch S2 is turned ON and the first capacitor C6 is discharged by the first current source I1. Thus the peak current signal Vlim decreases again, as shown in subinterval B3 in FIG. 4. If the peak current signal Vlim decreases to the minimum value Vlim_min, then the third switch D3 is turned ON, and the first capacitor C6 is coupled to the voltage source 54. As a result, the value of the peak current signal Vlim is fixed to the minimum value Vlim_min, as shown in subinterval B4 in FIG. 4.

In a conclusion, during every switching cycle, the peak current signal Vlim has the maximum value Vlim_max at the pulse of the frequency control signal Con. Then the peak current generator 105 detects the time period from the current pulse to the immediate next pulse of the frequency control signal Con to generate the corresponding peak current signal Vlim. As can be seen from FIG. 4 that: the heavier the load, the higher the switching frequency, and the larger the value of the peak current signal Vlim, to make sure that the ON time of the first switch M1 is prolonged to increase the energy supplied to the load; the lighter the load, the lower the switching frequency, and the smaller the value of the peak current signal Vlim, to make sure that the ON time of the first switch M1 is shortened to decrease the energy supplied to the load. Therefore, the efficiency of the switching mode power supply is improved by adjusting the peak current signal Vlim to regulate the energy provided to the load.

In one embodiment, the timing circuit 51 may be automatically generated by hardware description language, for example, VHDL (Very-High-Speed Integrated Circuit Hardware Description Language) or Verilog HDL, by person of ordinary skill in the art.

Figure 5:
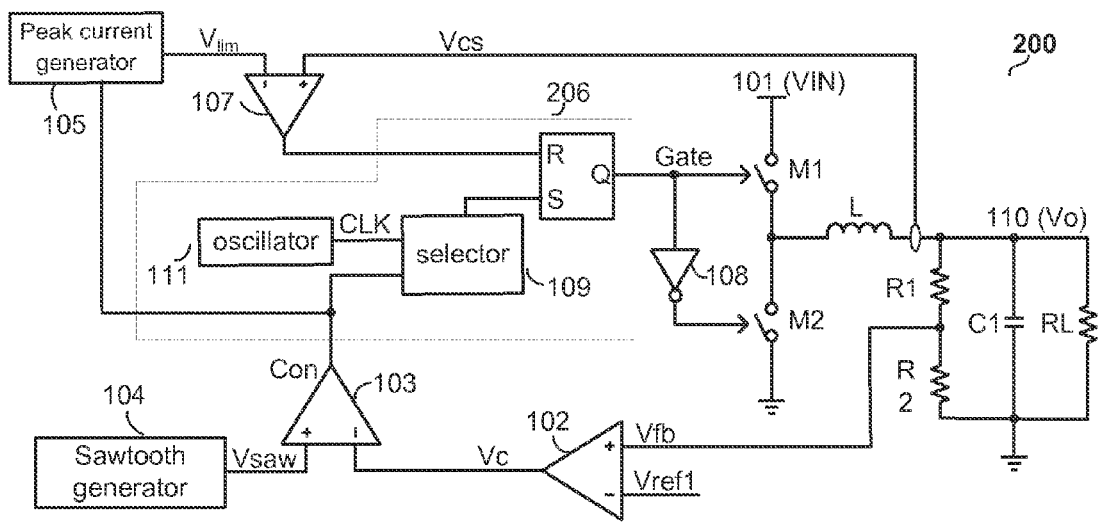
FIG. 5 schematically shows a switching mode power supply 200 in accordance with an embodiment of the present invention.

FIG. 5 schematically shows a switching mode power supply 200 in accordance with an embodiment of the present invention. Compared with the switching mode power supply 100 in FIG. 1, the switching mode power supply 200 has a logic circuit 206 comprising: an oscillator 111 configured to generate a clock signal CLK with a fixed frequency fs_max; a selector 109 having a first input terminal coupled to the output terminal of the error comparator 103 to receive the frequency control signal Con, a second input terminal coupled to the oscillator 111 to receive the clock signal CLK, and an output terminal configured to select the lower frequency value of between the frequency control signal Con and the clock signal; a third RS flip-flop having a set terminal "S" coupled to the output terminal of the selector 109, a reset terminal "R" coupled to the output terminal of the peak current comparator 107 to receive the current limit signal, and an output terminal "Q" configured to generate the switching signal "Gate" based on the output signal of the selector 109 and the current limit signal.

Figure 6:
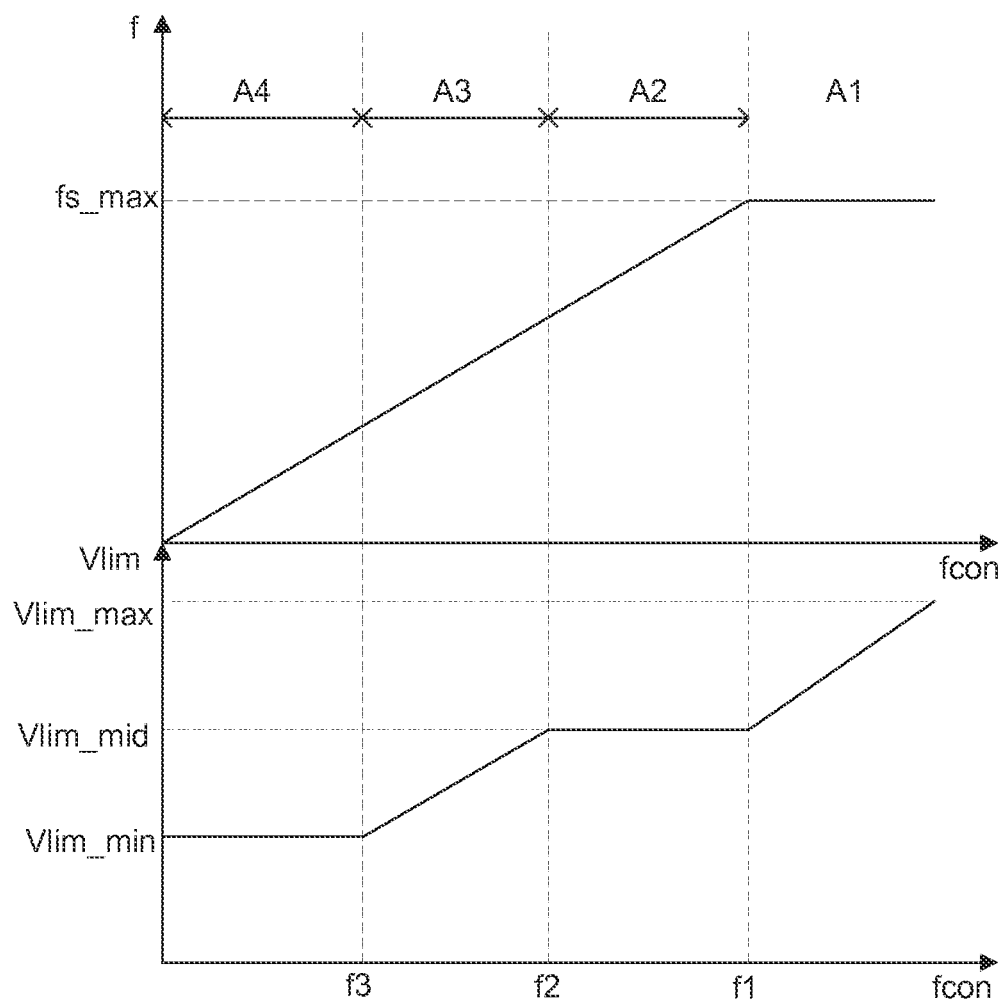
FIG. 6 shows the waveforms of the switching frequency "f" of the switching mode power 200 in FIG. 6 and the frequency "fcon" of the frequency control signal Con.

During the normal operation of the switching mode power supply 200, the switching frequency of the power supply 200, as well as the peak current signal Vlim, is adjusted according to the load of the power supply 200. For example, when the power supply 200 works under light load, the frequency of the frequency control signal Con is relatively low as described before. The frequency control signal Con is selected by the selector 109 to the set terminal "S" of the third RS flip-flop to control the power switches M1 and M2. Then when the load becomes heavy and the frequency of the frequency control signal Con is higher than the clock signal CLK, the clock signal CLK is selected by the selector 109 to the set terminal of the third "S" flip-flop to control the power switches M1 and M2. FIG. 6 schematically shows the waveforms of the switching frequency "f" of the switching mode power 200 in FIG. 5 and the frequency "fcon" of the frequency control signal Con.

In a conclusion, the switching mode power supply 200 works with fixed switching frequency under heavy load. In another way, the highest switching frequency of the switching mode power supply 200 is limited to be the frequency of the clock signal CLK, to avoid high switching loss under heavy load. Thus the efficiency of the switching mode power supply 200 is further improved.

Figure 7:
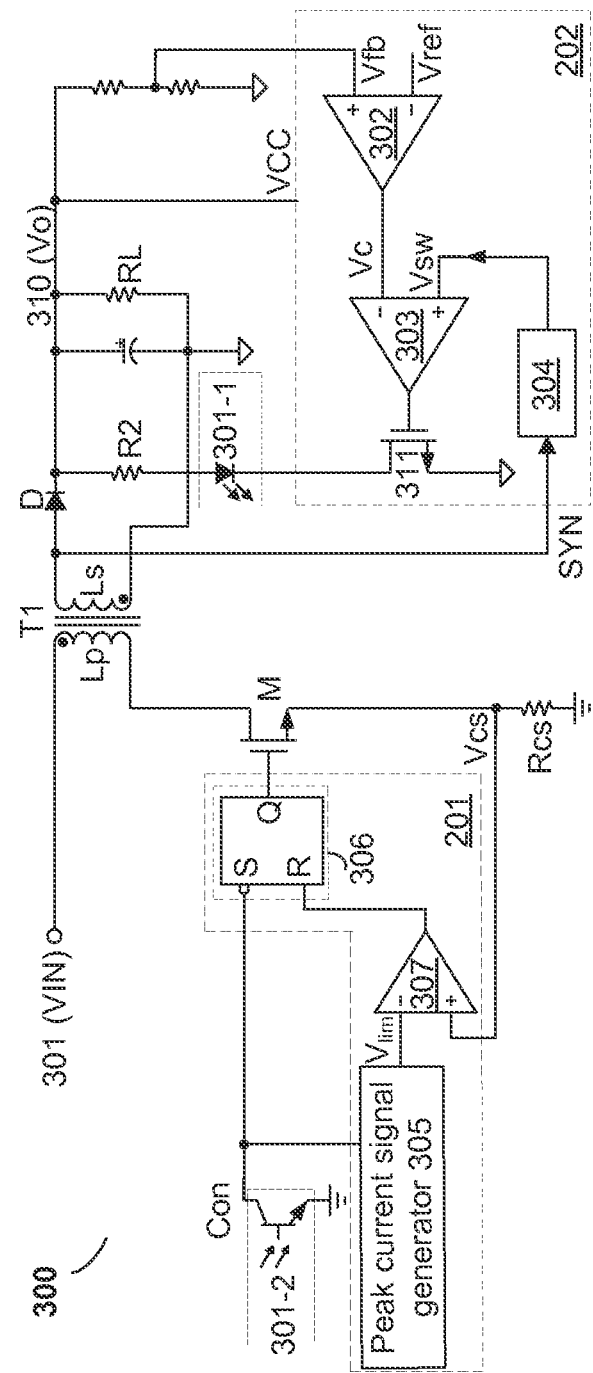
FIG. 7 schematically shows a switching mode power supply in accordance with an embodiment of the present invention.

In the above embodiments, the switching mode power supplies 100 and 200 are both non-isolated switching mode power supplies. Persons of ordinary skill in the art should know that the present invention may be applied in isolated switching mode power supplies. FIG. 7 schematically shows a switching mode power supply 300 in accordance with an embodiment of the present invention.

In FIG. 7, the switching mode power supply 300 comprises: an input port 301 configured to receive the input voltage VIN; an output port 310 configured to provide the output voltage Vo to the load RL; a transformer T1 having a primary winding Lp and a secondary winding Ls respectively having a first terminal and a second terminal, wherein the first terminal of the primary winding is configured to receive the input voltage VIN; a primary power switch "M" having a first terminal coupled to the second terminal of the primary winding Lp, a second terminal coupled to the ground reference node, and a control terminal; a secondary power switch "D" coupled between the first terminal of the secondary winding Ls and the output port 310; a secondary controller 202 having a power terminal VCC coupled to the output port 310 to receive the output voltage Vo, wherein the secondary controller 202 comprises: an error amplifier 302 having a first input terminal configured to receive the feedback signal Vfb indicative of the output voltage Vo, a second input terminal configured to receive the reference signal Vfb, and an output terminal configured to generate the amplified error signal Vc based on the feedback signal Vfb and the reference signal Vref; an error comparator 303 having a first input terminal coupled to the output terminal of the error amplifier 302 to receive the amplified error signal Vc, a second input terminal configured to receive a second sawtooth signal Vsw, and an output terminal configured to generate a first comparison signal based on the amplified error signal Vc and the second sawtooth signal Vsw; and a fourth switch 311 having a first terminal coupled to the ground reference node, a control terminal coupled to the output terminal of the error comparator 303 to receive the first comparison signal and a second terminal, and wherein the fourth switch 311 is turned ON and OFF by the first comparison signal; a coupled device having an input side 301-1 coupled between the output port 310 and the first terminal of the fourth switch 311, and an output side 301-2 configured to generate a frequency control signal Con based on the signals received by the input side 301-1; a primary controller 201 comprising; a peak current generator 305 coupled to the output side 301-2 of the coupled device to receive the frequency control signal Con, and to generate the peak current signal Vlim based on the frequency control signal Con; a current comparator 307 having a first input terminal configured to receive a current sense signal Vcs indicative of a current flowing through the primary winding, a second input terminal coupled to the peak current generator 305 to receive the peak current signal Vlim, and an output terminal configured to generate a current limit signal based on the current sense signal Vcs and the peak current signal Vlim; a logic circuit 306 having a first input terminal coupled to the output side 301-2 of the coupled device to receive the frequency control signal Con, a second input terminal coupled to the output terminal of the peak current comparator 307 to receive the current limit signal, and an output terminal configured to generate the switching signal "Gate" to control the primary power switch "M" based on the frequency control signal Con and the current limit signal.

In the example of FIG. 7, the coupled device comprises an opto-coupler. The input side 301-1 comprises a LED (light emitting diode), and the output side 301-2 comprises an optical transistor. In one embodiment, the LED comprises an anode coupled to the output terminal 310 via a resistor R2, and a cathode coupled to the first terminal of the fourth switch 311. The optical transistor has a first terminal coupled to the ground reference node, and a second terminal configured to provide the frequency control signal Con. The voltage at the anode of the LED may be regulated by changing the resistance of the resistor R2. Persons of ordinary skill in the art should know that the resistor R2 may be omitted. The operation of the opto-coupler is known to persons of ordinary skill in the art and is not described here for brevity. Any suitable circuit, like hall sensor and so on, that could perform the function of the opto-coupler in FIG. 7 may be used without detracting from the merits of the present invention.

In one embodiment, the switching mode power supply 300 further comprises a current sense resistor Rcs coupled between the primary power switch "M" and the ground reference node to sense the current flowing through the primary power switch "M", so that to provide the current sense signal Vcs.

In one embodiment, the relationship between the peak current signal Vlim and frequency control signal Con is determined by the switching frequency "f" of the switching mode power supply 300: a) when the switching frequency "f" is higher than a first frequency threshold "f" (f<f1), the peak current signal Vlim decreases from a maximum value Vlim_max as the decrease of the switching frequency "f"; b) when the switching frequency "f" is between the first frequency threshold f1 and a second frequency threshold f2 (f1>f>f2), the peak current signal Vlim is fixed to a middle value Vlim_mid; c) when the switching frequency "f" is between the second frequency threshold f2 and a third frequency threshold f3 (f2>f>f3), the peak current signal Vlim decreases from the middle value Vlim_mid as the decrease of the switching frequency "f"; d) when the switching frequency "f" is lower than the third frequency threshold "f3" (f<f3), the peak current signal Vlim is fixed to a minimum value Vlim_min; wherein Vlim_max>Vlim_mid>Vlim_min, and f1>f2>f3. That is:

$$Vlim = \begin{cases} Vlim\_max - k \times \frac{1}{f} & (f > f1) \\ Vlim\_mid & (f2 \le f \le f1) \\ Vlim\_mid - k \times \left(\frac{1}{f} - \frac{1}{f2}\right) & (f3 < f < f2) \\ Vlim\_min & (f \le f3) \end{cases} \quad (1)$$

wherein k is a constant coefficient in a given switching mode power supply 300.

In one embodiment, the secondary controller 202 further comprises a sawtooth signal generator 304 having an input terminal coupled to the first terminal of the secondary winding Ls to receive a synchronous signal SYN and an output terminal configured to provide the second sawtooth signal Vsw based on the synchronous signal SYN. The operation of the sawtooth generator 304 is: when the secondary power switch D is turned ON, the synchronous signal SYN is logical high and the second sawtooth signal Vsw increases; when the second sawtooth signal Vsw reaches the amplified error signal Vc, the second sawtooth signal Vsw turns to be logical low. The second sawtooth signal Vsw increases again when the secondary power switch D is turned ON in the next switching cycle.

In one embodiment, the synchronous signal SYN is omitted. The logical low time of the second sawtooth signal Vsw is preset to a constant time period t. That is to say, the second sawtooth signal Vsw increases after a constant time period t, and becomes logical low when it reaches the amplified error signal Vc. And after the constant time period t, the second sawtooth signal Vsw increases again. The operation repeats so that the second sawtooth signal has a waveform shown in FIG. 3. The constant time period t may be adjusted in difference systems.

In one embodiment, the logic circuit 306 comprises a third RS flip-flop having a set terminal "S" coupled to the output side 301-2 of the coupled device to receive the frequency control signal Con, a reset terminal "R" coupled to the output terminal of the current comparator 307 to receive the current limit signal, and an output terminal "Q" configured to generate the switching signal "Gate" based on the frequency control signal Con and the current limit signal. In one embodiment, the third RS flip-flop is set by a falling edge of the signal. Persons of ordinary skill in the art should know that the third RS flip-flop may be designed to be set by a rising edge of the signal if there is an inverter coupled between the set signal and the third RS flip-flop.

During the normal operation of the switching mode power supply 300, when the second sawtooth signal Vsw increases to reach the amplified error signal Vc, the first comparison signal generated by the error comparator 303 becomes logical high to turn ON the fourth switch 311. Then second sawtooth signal Vsw becomes logical low. After a preset constant time period "t", the second sawtooth signal Vsw increases again. During when the fourth switch 311 is ON, a current flows through the resistor R2, the LED, and the fourth switch 311. The optical transistor senses the current flowing through the LED, and the frequency control signal Con becomes logical low so as to set the third RS flip-flop. As a result, the primary power switch "M" is turned ON, and the current flowing through the primary power switch "M" increases, followed by the increase of the current sense signal Vcs. When the current sense signal Vcs increases to reach the peak current signal Vlim, the current limit signal becomes logical high, and the third RS flip-flop is reset. Thus the primary power switch "M" is turned OFF. The primary power switch "M" will be turned ON again when the second sawtooth signal Vsw reaches the amplified error signal Vc again, and the operation repeats.

Figure 8:
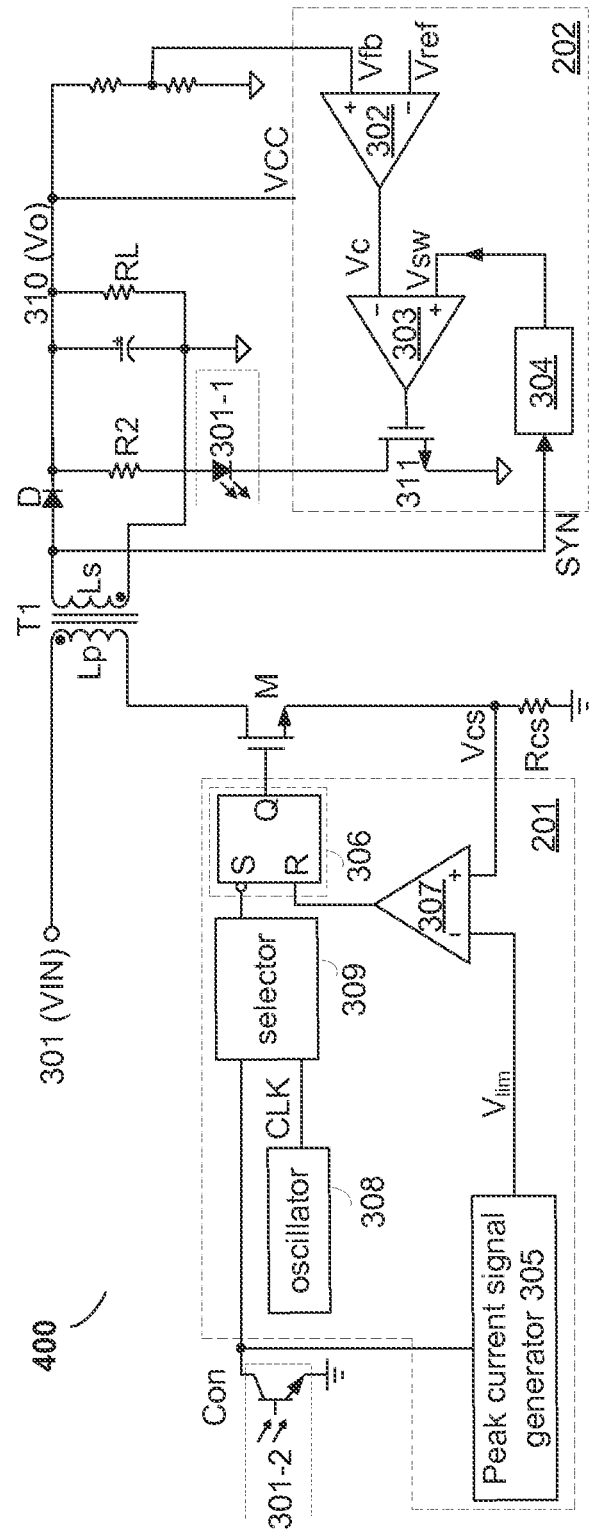
FIG. 8 schematically shows a switching mode power supply 400 in accordance with an embodiment of the present invention.

FIG. 8 schematically shows a switching mode power supply 400 in accordance with an embodiment of the present invention. Compared with the switching mode power supply 300 in FIG. 7, the switching mode power supply 400 further comprises: an oscillator 308 configured to generate a clock signal CLK with a fixed frequency fs_max; a selector 309 having a first input terminal coupled to the output side 301-2 of the coupled device to receive the frequency control signal Con, a second input terminal coupled to the oscillator 308 to receive the clock signal CLK, and an output terminal configured to select the lower frequency value of between the frequency control signal Con and the clock signal to the first input terminal of the logic circuit 306.

In the examples of FIGS. 7 and 8, the secondary controller generates a first comparison signal based on the feedback signal Vfb. The coupled device generates the frequency control signal based on the first comparison signal. Then the primary controller controls the primary power switch based on the frequency control signal. In one embodiment, the primary controller and the secondary controller are integrated in a chip. In that case, the feedback signal Vfb is provided to the chip by the coupled device.

During the normal operation of the switching mode power supply 400, when the power supply 400 works under light load, the frequency of the frequency control signal Con is relatively low as described before. The frequency control signal Con is selected by the selector 309 to be provided to the first input terminal of the logic circuit 306 to control the power switches M1 and M2. Then when the load becomes heavy that the frequency of the frequency control signal Con is higher than the clock signal CLK, the clock signal CLK is selected by the selector 309 to be provided to the first input terminal of the logic circuit 306 to control the power switches M1 and M2.

Figure 9:
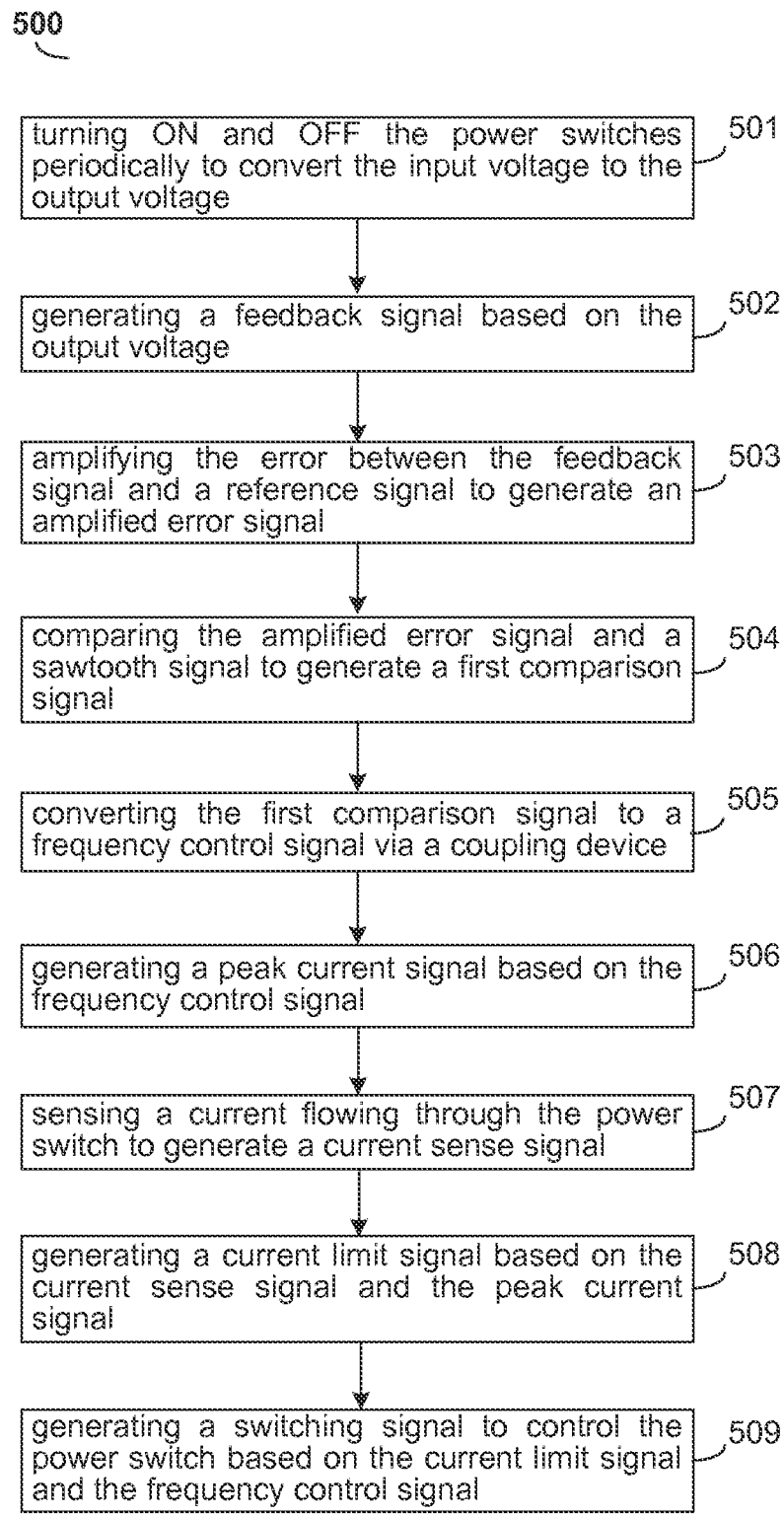
FIG. 9 shows a flow chart 500 of a method of controlling a switching mode power supply in accordance with an embodiment of the present invention.

FIG. 9 shows a flow chart 500 of a method of controlling a switching mode power supply in accordance with an embodiment of the present invention. The switching mode power supply comprises: an input port configured to receive the input voltage, an output port configured to provide the output voltage, an energy storage component and a power switch coupled between the input terminal and the output terminal. As shown in FIG. 9, the method comprises: step 501, turning ON and OFF the power switch periodically to convert the input voltage to the output voltage; step 502, generating a feedback signal indicative of the output voltage; step 503, amplifying the error between the feedback signal and a reference signal to generate an amplified error signal; step 504, comparing the amplified error signal with a sawtooth signal to generate a first comparison signal; step 505, converting the first comparison signal to a frequency control signal via a coupled device; step 506, generating a peak current signal based on the frequency control signal; step 507, sensing a current flowing through the power switch to generate a current sense signal; step 508, generating a current limit signal based on the current sense signal and the peak current signal; and step 509, generating a switching signal to control the power switch based on the current limit signal and the frequency control signal.

In one embodiment, the logical low time of the sawtooth signal is fixed to a constant value. That is to say, the sawtooth signal increases after a constant time period, and becomes logical low when it reaches the amplified error signal. And after a constant time period, the sawtooth signal increases again. The sawtooth signal may increase with a constant slope or with other waveforms and the constant time period may be adjusted in difference systems.

In one embodiment, the sawtooth signal is logical low when the current flowing through the energy storage component increases. And start from the peak of the current flowing through the energy storage component, the sawtooth signal increases. The sawtooth signal stays logical low again when it reaches the amplified error signal. Then from the next peak of the current flowing through the energy storage component, the sawtooth signal increases again and the operation repeats.

In one embodiment, the peak current signal is divided into four subintervals according to the frequency control signal indicating the switching frequency of the switching mode power supply: a). when the switching frequency is larger than a first frequency threshold, the peak current signal decreases from a maximum value as the decrease of the switching frequency; b). when the switching frequency is between the first frequency threshold and a second frequency threshold, the peak current signal is fixed to a first value; c). when the switching frequency is between the second frequency threshold and a third frequency threshold, the peak current signal decreases from the first value as the decrease of the switching frequency; d) when the switching frequency is lower than the third frequency threshold, the peak current signal is fixed to a second value; wherein the first value is larger than the second value, the first frequency threshold is larger than the second frequency threshold and the second frequency threshold is larger than the third frequency threshold.

In one embodiment, the step 509 may be replaced by: generating a clock signal with constant frequency; selecting the lower frequency value of the frequency control signal and the clock signal as a frequency signal; generating a switching signal to control the power switch based on the current limit signal and the frequency signal.

An effective technique for controlling a switching mode power supply has been disclosed. While specific embodiments of the present invention have been provided, it is to be understood that these embodiments are for illustration purposes and not limiting. Many additional embodiments will be apparent to persons of ordinary skill in the art reading this invention.

We claim:

1. A switching mode power supply, comprising: an input port configured to receive an input voltage; an output port configured to provide an output voltage to a load; an energy storage component and a power switches coupled between the input port and the output port;
   an error amplifier having a first input terminal configured to receive a feedback signal indicative of the output voltage, a second input terminal configured to receive a reference signal, and an output terminal configured to generate an amplified error signal based on the feedback signal and the reference signal;
   an error comparator having a first input terminal configured to receive the amplified error signal, a second input terminal configured to receive a first sawtooth signal, and an output terminal configured to generate a frequency control signal based on the amplified error signal and the first sawtooth signal;
   a peak current generator having an input terminal coupled to the output terminal of the error comparator to receive the frequency control signal, and an output terminal configured to generate a peak current signal based on the frequency control signal;
   wherein the value of the peak current signal is varying with a switching frequency of the switching mode power supply;
   a peak current comparator having a first input terminal coupled to the output terminal of the peak current generator to receive the peak current signal, a second input terminal configured to receive a current sense signal indicative of a current flowing through the energy storage component, and an output terminal configured to generate a current limit signal based on the peak current signal and the current sense signal; and
   a logic circuit having a first input terminal coupled to the output terminal of the error comparator to receive the frequency control signal, a second input terminal coupled to the output terminal of the peak current comparator to receive the current limit signal, an output terminal configured to generate a switching signal to control the power switches based on the frequency control signal and the current limit signal, and
   an oscillator configured to generate a clock signal with a fixed frequency; a selector having a first input terminal coupled to the output terminal of the error comparator to receive the frequency control signal, a second input terminal coupled to the oscillator to receive the clock signal, and an output terminal configured to select the lower frequency value of between the frequency control signal and the clock signal; a RS flip-flop having a set terminal coupled to the output terminal of the selector, a reset terminal coupled to the output terminal of the peak current comparator to receive the current limit signal, and an output terminal configured to generate the switching signal based on the output signal of the selector and the current limit signal.

2. The switching mode power supply of claim 1, wherein the logic circuit comprises:
   a RS flip-flop having a set terminal configured to receive the frequency control signal, a reset terminal configured to receive the current limit signal, and an output terminal configured to generate the switching signal based on the frequency control signal and the current limit signal.

3. The switching mode power supply of claim 1, wherein:
   when the switching frequency is higher than a first frequency threshold, the peak current signal decreases from a maximum value as the decrease of the switching frequency;
   when the switching frequency is between the first frequency threshold and a second frequency threshold, the peak current signal is fixed to a middle value;
   when the switching frequency is between the second frequency threshold and a third frequency threshold, the peak current signal decreases from the middle value as the decrease of the switching frequency; and
   when the switching frequency is lower than the third frequency threshold, the peak current signal is fixed to a minimum value;
   wherein the maximum value is larger than the middle value and the middle value is larger than the minimum value.

4. A switching mode power supply, comprising: an input port configured to receive an input voltage; an output port configured to provide an output voltage to a load; an energy storage component and a power switches coupled between the input port and the output port; an error amplifier having a first input terminal configured to receive a feedback signal indicative of the output voltage, a second input terminal configured to receive a reference signal, and an output terminal configured to generate an amplified error signal based on the feedback signal and the reference signal;
   an error comparator having a first input terminal configured to receive the amplified error signal, a second input terminal configured to receive a first sawtooth signal, and an output terminal configured to generate a frequency control signal based on the amplified error signal and the first sawtooth signal;
   a peak current generator having an input terminal coupled to the output terminal of the error comparator to receive the frequency control signal, and an output terminal configured to generate a peak current signal based on the frequency control signal,
   wherein the value of the peak current signal is varying with a switching frequency of the switching mode power supply;
   a peak current comparator having a first input terminal coupled to the output terminal of the peak current generator to receive the peak current signal, a second input terminal configured to receive a current sense signal indicative of a current flowing through the energy storage component, and an output terminal configured to generate a current limit signal based on the peak current signal and the current sense signal; and a logic circuit having a first input terminal coupled to the output terminal of the error comparator to receive the frequency control signal, a second input terminal coupled to the output terminal of the peak current comparator to receive the current limit signal, and an output terminal configured to generate a switching signal to control the power switches based on the frequency control signal and the current limit signal;

wherein the peak current generator comprises:

a timing circuit having an input terminal configured to receive the frequency control signal, and an output terminal configured to generate a timing control signal based on the frequency control signal;

a first switch having a first terminal coupled to a voltage source having a value equal to the maximum value of the peak current signal, a control terminal configured to receive the frequency control signal, and a second terminal;

a second switch having a first terminal coupled to the second terminal of the first switch, a control terminal coupled to the timing circuit to receive the timing control signal, and a second terminal; and a third switch having a first terminal coupled to the second terminal of the second switch, a second terminal coupled to a voltage source having a value equal to the minimum voltage value of the peak current signal;

a first capacitor having a first terminal coupled to the connection node of the first switch and the second switch, and a second terminal coupled to a ground reference node, wherein the peak current signal is provided at the first terminal of the capacitor; and a first current source having a first terminal coupled to the connection node of the second switch and the third switch, and a second terminal coupled to the ground reference node.

5. The switching mode power supply of claim 4, wherein the timing circuit comprises:

a first timing unit, a second timing unit, an OR gate and a RS flip-flop, wherein the first timing unit configured to receive the frequency control signal, and to generate a first timing signal based on the frequency control signal;

the second timing unit configured to receive the frequency control signal, and to generate a second timing signal based on the frequency control signal;

the OR gate has a first input terminal configured to receive the second timing signal, a second input terminal configured to receive the frequency control signal, and an output terminal; and the RS flip-flop has a set terminal coupled to the first timing unit to receive the first timing signal, a reset terminal coupled to the output terminal of the OR gate, and an output terminal configured to generate a timing control signal based on the first timing signal and the output signal of the OR gate.

6. A switching mode power supply, comprising: an input port configured to receive an input voltage; an output port configured to provide an output voltage to a load;

a transformer having a primary winding and a secondary winding respectively having a first terminal and a second terminal;

a primary power switch coupled to the primary winding of the transformer; a secondary power switch coupled to the secondary winding of the transformer; a secondary controller configured to generate a first comparison signal based on the output voltage and a feedback signal indicative of the output voltage;

a coupled device having an input side coupled to the secondary controller to receive the first comparison signal, and an output side configured to provide a frequency control signal based on the first comparison signal; a primary controller configured to control the primary power switch, comprising:

a peak current generator having an input terminal coupled to the output side of the coupled device to receive the frequency control signal, and an output terminal configured to generate a peak current signal based on the frequency control signal, wherein the value of the peak current signal is varying with a switching frequency of the switching mode power supply;

a peak current comparator having a first input terminal coupled to the output terminal of the peak current generator to receive the peak current signal, a second input terminal configured to receive a current sense signal indicative of a current flowing through the inductor, and an output terminal configured to generate a current limit signal based on the current limit signal and the current sense signal; and a logic circuit having a first input terminal coupled to the output terminal of the error comparator to receive the frequency control signal, a second input terminal coupled to the output terminal of the peak current comparator to receive the current limit signal, and an output terminal configured to generate a switching signal to control the primary power switch based on the frequency control signal and the current limit signal, wherein the logic circuit comprises: an oscillator configured to generate a clock signal with a fixed frequency; a selector having a first input terminal coupled to the output side of the coupled device to receive the frequency control signal, a second input terminal coupled to the oscillator to receive the clock signal, and an output terminal configured to select the lower frequency value of between the frequency control signal and the clock signal which has the smaller frequency; a RS flip-flop having a set terminal coupled to the output terminal of the selector, a reset terminal coupled to the output terminal of the peak current comparator to receive the current limit signal, and an output terminal configured to generate the switching signal based on the output signal of the selector and the current limit signal.

7. The switching mode power supply of claim 6, wherein the logic circuit comprises:

a RS flip-flop having a set terminal coupled to the output side of the coupled device to receive the frequency control signal, a reset terminal coupled to the output terminal of the current comparator to receive the current limit signal, and an output terminal configured to generate the switching signal based on the frequency control signal and the current limit signal.

8. The switching mode power supply of claim 6, wherein the secondary controller comprises:

an error amplifier having a first input terminal configured to receive the feedback signal indicative of the output voltage, a second input terminal configured to receive the reference signal, and an output terminal configured to generate the amplified error signal based on the feedback signal and the reference signal;

an error comparator having a first input terminal coupled to the output terminal of the error amplifier to receive the amplified error signal, a second input terminal configured to receive a second sawtooth signal, and an output terminal configured to generate the first comparison signal based on the amplified error signal and the second sawtooth signal;
a fourth switch having a first terminal, a second terminal coupled to the ground reference node and a control terminal coupled to the output terminal of the error comparator to receive the first comparison signal, and wherein the fourth switch is turned ON and OFF by the first comparison signal.

9. The switching mode power supply of claim 6, wherein:
when the switching frequency is higher than a first frequency threshold, the peak current signal decreases from a maximum value as the decrease of the switching frequency;
when the switching frequency is between the first frequency threshold and a second frequency threshold, the peak current signal is fixed to a middle value;
when the switching frequency is between the second frequency threshold and a third frequency threshold, the peak current signal decreases from the middle value as the decrease of the switching frequency; and
when the switching frequency is lower than the third frequency threshold, the peak current signal is fixed to a minimum value;
wherein the maximum value is larger than the middle value and the middle value is larger than the minimum value.

10. A switching mode power supply, comprising: an input port configured to receive an input voltage; an output port configured to provide an output voltage to a load;
a transformer having a primary winding and a secondary winding respectively having a first terminal and a second terminal;
a primary power switch coupled to the primary winding of the transformer; a secondary power switch coupled to the secondary winding of the transformer; a secondary controller configured to generate a first comparison signal based on the output voltage and a feedback signal indicative of the output voltage;
a coupled device having an input side coupled to the secondary controller to receive the first comparison signal, and an output side configured to provide a frequency control signal based on the first comparison signal; a primary controller configured to control the primary power switch, comprising:
a peak current generator having an input terminal coupled to the output side of the coupled device to receive the frequency control signal, and an output terminal configured to generate a peak current signal based on the frequency control signal,
wherein the value of the peak current signal is varying with a switching frequency of the switching mode power supply;
a peak current comparator having a first input terminal coupled to the output terminal of the peak current generator to receive the peak current signal, a second input terminal configured to receive a current sense signal indicative of a current flowing through the inductor, and an output terminal configured to generate a current limit signal based on the current limit signal and the current sense signal; and
a logic circuit having a first input terminal coupled to the output terminal of the error comparator to receive the frequency control signal, a second input terminal coupled to the output terminal of the peak current comparator to receive the current limit signal, and an output terminal configured to generate a switching signal to control the primary power switch based on the frequency control signal and the current limit signal;
wherein the peak current generator comprises:
a timing circuit having an input terminal configured to receive the frequency control signal, and an output terminal configured to generate a timing control signal based on the frequency control signal;
a first switch having a first terminal coupled to a voltage source having a value equal to the maximum value of the peak current signal, a control terminal configured to receive the frequency control signal, and a second terminal;
a second switch having a first terminal coupled to the second terminal of the first switch, a control terminal coupled to the timing circuit to receive the timing control signal, and a second terminal; and
a third switch having a first terminal coupled to the second terminal of the second switch, a second terminal coupled to a voltage source having a value equal to the minimum voltage value of the peak current signal;
a first capacitor having a first terminal coupled to the connection of the first switch and the second switch, and a second terminal coupled to a ground reference node, wherein the peak current signal is provided at the first terminal of the capacitor; and
a first current source having a first terminal coupled to the connection node of the second switch and the third switch, and a second terminal coupled to the ground reference node.

11. The switching mode power supply of claim 10, wherein the timing circuit comprises:
a first timing unit, a second timing unit, an OR gate and a RS flip-flop, wherein
the first timing unit configured to receive the frequency control signal, and to generate a first timing signal based on the frequency control signal;
the second timing unit configured to receive the frequency control signal, and to generate a second timing signal based on the frequency control signal;
the OR gate has a first input terminal configured to receive the second timing signal, a second input terminal configured to receive the frequency control signal, and an output terminal; and
the RS flip-flop has a set terminal coupled to the first timing unit to receive the first timing signal, a reset terminal coupled to the output terminal of the OR gate and an output terminal configured to generate a timing control signal based on the first timing signal and the output signal of the OR gate.

* * * * *